United States Patent [19]

Baker

[11] 4,086,617
[45] Apr. 25, 1978

[54] VIDEO DISC PLAYER MECHANISM CONTROL SYSTEM

[75] Inventor: Alfred Lynn Baker, Indianapolis, Ind.

[73] Assignee: RCA Corporation, New York, N.Y.

[21] Appl. No.: 756,833

[22] Filed: Jan. 5, 1977

[30] Foreign Application Priority Data

Jan. 5, 1976 United Kingdom ............... 00207/76

[51] Int. Cl.² .................. H04N 5/76; G11B 17/06
[52] U.S. Cl. .......................... 358/128; 179/100.4 D; 274/9 RA; 274/23 A
[58] Field of Search ............................ 358/127, 128; 179/100.4 R, 100.4 D, 100.1 B, 100.4 M; 274/23 R, 23 A, 9 R, 9 RA, 13 R, 15 R

[56] References Cited

U.S. PATENT DOCUMENTS

| 3,272,513 | 9/1966 | Jeles | 274/23 A |
|---|---|---|---|
| 3,599,988 | 8/1971 | Norris | 274/9 R |
| 3,662,363 | 5/1972 | Chertok | 179/100.4 D |
| 3,767,848 | 10/1973 | Schuller | 274/23 A |
| 3,870,320 | 3/1975 | Torrington | 274/23 A |
| 3,940,148 | 2/1976 | Torrington et al. | 274/1 R |
| 3,954,272 | 5/1976 | Leedom et al. | 274/23 A |
| 3,993,316 | 11/1976 | Fairbanks | 274/23 A |
| 3,993,863 | 11/1976 | Leedom et al. | 179/100.4 D |
| 4,017,677 | 4/1977 | Baker | 179/100.4 D |
| 4,017,678 | 4/1977 | Baker | 179/100.4 D |

*Primary Examiner*—Raymond F. Cardillo, Jr.
*Attorney, Agent, or Firm*—Eugene M. Whitacre; William H. Meagher

[57] ABSTRACT

Coupling of pickup arm housing to a slow moving belt for translational motion during record playback is controlled by a play solenoid, while coupling to a fast moving belt for fast forward and reverse motions is controlled by respective forward and reverse solenoids. Player includes manually actuated push button controls for play, forward search, reverse search, pause, reject and power on/off functions. Mechanism actuated switches include a land switch actuated when pickup location is over beginning of recorded information, a travel limit switch actuated when pickup location is beyond ending of recorded information, and a rest switch placed in one switching condition when housing returns to an off-record rest position.

22 Claims, 9 Drawing Figures

VIDEO DISC PLAYER MECHANISM CONTROL SYSTEM

The present invention relates generally to control systems for a disc record player, and particularly to novel and improved systems for control of player mechanisms suitable for playback of video disc records, such as video disc records of the type disclosed in U.S. Pat. No. 3,842,194 — Clemens.

In records of the type shown in said Clemens patent, an information track incorporates geometric variations in the bottom of a spiral groove in a disc, the surface of which comprises conductive material covered with a thin coating of dielectric material. In playback of such disc records, variations in the capacitance presented between a conductive electrode on a tracking stylus and the conductive material of the disc occur as the disc is rotated by a supporting turntable; the capacitance variations are sensed to recover the recorded information.

As shown in the aforesaid Clemens patent, a pickup arm supporting the stylus at one end is desirably mounted in a housing which is subject to translational movement toward the turntable center during record playback. With suitable correlation between the translational movement and the turntable rotation, the pickup arm axis is maintained substantially tangential to the record groove at the point of stylus engagement, preserving a substantially constant transverse attitude of the stylus electrode with respect to the information track in the groove bottom.

In U.S. Pat. No. 3,870,320 — Torrington, an advantageous system for effecting the aforesaid translational movement of the pickup arm housing, employing an endless belt loop driver in response to turntable rotation, is disclosed. A rail guided carriage, to which the arm housing is secured, supports a solenoid actuated mechanism which grips the belt during playback to transmit the belt motion to the housing. In the Torrington system, the player is additionally provided with a second endless belt loop, also driven in response to turntable rotation, but at a faster speed than that provided for the play drive belt. Additional selectively energized solenoid mechanisms are supported by the carriage in proximity to respective oppositely traveling segments of the second belt loop. Gripping of one loop segment by one of these additional mechanisms transmits a rapid translational motion to the arm housing directed toward the turntable center, while gripping of another loop segment by the other of these additional mechanisms transmits a rapid motion to the arm housing in the opposite direction. For a normal playback cycle, a suitable sequence of mechanism energizations provides (1) a fast forward (i.e., toward turntable center) motion of the housing from an off-record rest position (at one side of the turntable) to an above-record initial playback position (locating the stylus above groove convolutions containing the beginning of recorded information); (2) continued forward motion of the housing at a slow speed, substantially matching the convolution-by-convolution advance of the tracking stylus, until the conclusion of the recorded information is reached; and (3) rapid reverse motion, returning the housing to the off-record rest position. Desirably, the pickup arm is lowered to permit stylus engagement with the record only during the slow forward motion of the housing.

The solenoid mechanisms associated with the rapidly moving belt of the Torrington system additionally provide a facility for effecting forward search and reverse search functions, whereby one may depart from the normal playback sequence to move the pickup rapidly forward or back to select a particular segment of the recorded information for playback. In the player of the Torrington patent, the user is provided with: a start control for initiating the playback cycle; a forward search control for interrupting the playback cycle to achieve the aforementioned forward search function when desired; a reverse search control for interrupting the playback cycle to achieve the aforementioned reverse search function when desired; a pause control, which also interrupts playback, but in a manner leaving all solenoid mechanisms deenergized, whereby the housing remains stationary at the location at which the playback is interrupted; and a reject control, which terminates playback at any point desired, and energizes the reverse solenoid mechanism to cause a return of the housing to its rest position. The player of the Torrington patent additionally includes a trio of carriage actuated switches, including: a travel limit switch, actuated by the carriage when the housing passes the innermost playback portion so as to initiate a housing return to the rest position; a land switch actuated by the carriage when a forward traveling housing reaches an initial playback position, so as to effect transfer from rapid forward motion of the housing to forward housing motion at playback speed, and to cause stylus landing on the record; and a motor control switch, toggled to one switching condition by approach of a returning housing to the rest position, so as to deenergize the turntable motor, and toggled to a second switching condition by housing departure from the rest position, to provide a current path for motor energization in substitution for an energization path temporarily provided during start control activation.

The present invention is directed to an improved player control system, which, in addition to utilizing a plurality of advantageous features of the above-described Torrington patent system, incorporates modifications and supplements thereto, and novel interrelationships between user controls and mechanism actuated switches, which result in provision of desirable player mechanism operating modes and control responses, and avoidance of undesirable player mechanism operating modes and control responses.

In accordance with a first feature of the present invention, a novel arrangement is provided for control of AC energization of the player's power supply and turntable motor, with a user-actuated power on/off switch, a user-actuated play initiating switch, a mechanism-actuated rest switch and the rapid belt gripping forward solenoid mechanism in an interrelationship that provides an advantageous variety of energization modes for the player apparatus.

In an illustrative implementation of this feature, a first current path, for supplying an energizing alternating current to the player's power supply, is completed by the power switch when switched by the user to an "on" condition. The power supply, when energized, develops DC operating potentials for use by player circuitry, including the solenoid mechanisms for effecting motion transmission to the housing. When a play-initiating switch is thereafter actuated by the user, DC energization of the forward solenoid mechanism is initiated, producing movement of a movable member of the forward solenoid mechanism to effect gripping of the appropriate belt. A mechanical linkage permits use of this movement of the movable member to toggle a rest switch from an "off" condition to an "on" condition. When the rest switch is "on", it completes a second current path for supplying energizing alternating current to the turntable motor. Additionally the rest switch, in its "on" condition, cooperates with the power switch, in its "off" state, to complete a third current path for supplying energizing alternating current to the player's power supply. The rest switch responds to a housing return to its rest position from positions removed therefrom by switching from its "on" condition to its "off" condition.

With use of the aforesaid energization system, playback cycle initiation is positively assured when play switch actuation follows positioning of the power switch in the "on" position, with substantial independence of the duration of the play switch actuation. Only a very brief period of actuation is required to effect movement of the solenoid's movable member and the accompanying toggling of the rest switch to "on". This is in contrast with prior systems providing a temporary motor energizing path during a start switch actuation, and relying upon carriage motion to effect switching in of a non-temporary motor energizing path; in such systems, one must hold the start control in an on condition for a sufficiently long period to bring the motor and driven belts out of a standstill condition and then develop sufficient belt motion to move the carriage an appropriate distance for switch toggling action. Momentary actuation of the start switch by an impatient user of such a prior system can result in failure to initiate the playback cycle, due to provision of the temporary motor energization path for too short a period to effect the requisite carriage motion.

The above-described energization system of the present invention additionally provides the advantage of maintaining paths for energization of both motor and power supply when the power switch is switched to off at some intermediate point in the playback operation (i.e., at times when the housing is away from the rest position). It is highly desirable for protection of disc, stylus, and stylus arm couplings that the arm housing be returned to its rest position at the conclusion of a playing session. Moreover, where the player lid latch is interlocked with carriage return (to prevent access to player interior during playback operations), as, for example, in the system described in U.S. Pat. No. 3,940,148 — Torrington, et al., return to the rest position may be prerequisite to lid opening for disc record removal. In the energization arrangement of the present invention, retention of the housing in an away-from-rest position is not a necessary consequence of a mid-cycle switching of the power switch to "off", since energization paths for both power supply and motor are still supplied, thus providing a facility for effecting return of the housing to rest position. The housing return, in such instance, thereupon achieves the desired power removal by switching the rest switch to an off condition.

In accordance with a further feature of the present invention, an advantageous system for control of energization of the reverse solenoid mechanism (providing reverse housing motion) may be realized with use of a thyristor device providing a path for reverse solenoid energization under circumstances where it is desired to effect a latched energization in response to commands that may be momentary in duration, while an additional reverse solenoid energizaton path bypassing the thyristor is also selectively available for unlatched energization of the reverse solenoid for a time duration controlled by the user (i.e., for reverse search purposes). In an illustrative implementation of this feature, commands to which the thyristor may respond by initiating a latched energization of the reverse solenoid include: passage of the carriage beyond a preselected travel limit (as sensed by a carriage-actuated travel limit switch); development of an end-of-play signal by circuitry responsive to the recovery of recorded information signalling arrival at the end of the recorded material intended for playback; and actuation of a reject switch. By appropriate interrelationship of user controls with the anode-cathode path of the thyristor, the user may be provided with facilities for terminating the latched reverse travel short of the rest position destination, at his discretion. Illustratively, this unlatching capability is associated with the play, forward search, and pause controls.

Desirably, reverse solenoid energization is automatically accomplished when the previously discussed mid-cycle switching of the power switch to "off" occurs, pursuant to an additional feature of the present invention. Illustratively, this may be accomplished by use of the power switch in its off condition under such circumstances to provide a path supplying a turn-on command to the aforementioned thyristor. While this technique ensures initiation of a latched energization of the reverse solenoid, which will normally provide a housing return to rest position and ultimate deenergization of motor and power supply, an uninterrupted completion of the reverse travel and consequent deenergization is not positively assured, in view of the provision of unlatching facilities previously discussed. In a preferred alternative system for automatically accomplishing reverse solenoid energization when mid-cycle switching of the power switch to "off" occurs, the power switch, when in the off condition under such circumstances, completes a path for reverse solenoid energization which is independent of the thyristor and the play, forward search, and pause controls. In this preferred system, completion of the reverse travel, without interruption by said unlatching facilities, is positively assured.

Pursuant to another aspect of the present invention, an advantageous interconnection of the reverse search control and the carriage-actuated land switch is provided to limit the amount of reverse travel associated with actuation of the reverse search control. Latched energization of the reverse solenoid is provided by paths independent of the land switch, whereby reverse travel of the housing under such energization conditions is unaffected by passage through the initial playback position. In contrast, the unlatched energization of the reverse solenoid in response to reverse search control actuation is desirably provided via an energization path inclusive of the land switch in its "on" condition (i.e., in the switching condition assumed whenever the housing is at, or more forward than, the initial playback position). With such an arrangement, the unlatched energization path for the reverse solenoid is disrupted as the reverse travel of the housing carries it past the initial playback position, despite continued actuation of the reverse search control. This arrangement assures that one, using the reverse search function to seek out a recorded segment at or near the beginning of recorded information, who inadvertently overextends the reverse search control actuation, does not suffer the consequence of return of the housing to the rest position and attendant delay in effecting a desired recommencement of playback.

Another feature of the present invention provides an advantageous interrelationship between the forward search control and the travel limit switch so as to protect against undesirable consequences of inadvertent overextension of forward search control actuation when seeking out a recorded segment near the end of recorded information. During a normal playback cycle involving playback of a record from beginning to end, identification of recorded end-of-play information (for example, by apparatus of the type described in the copending U.S. Patent Application Serial No. 590,483 now U.S. Patent 4,017,678) results in development of an end-of-play control signal when the end of the recording is reached. In the previously described thyristor system, the thyristor responds to end-of-play signal development by turning on to initiate a latched energization of the reverse solenoid. If end-of-play signal development should fail to occur (e.g., due to defect conditions during pickup traversal of the recorded end-of-play indicating information), further forward travel of the carriage trips the travel limit switch, with the thyristor responding to the travel limit switch actuation by turning on to initiate a latched energization of the reverse solenoid. While this result is a desirable response to arrival at the travel limit position during operation in a play mode, such a result would be an undesirable consequence of arrival at the travel limit position during operation in a forward search mode. To avoid this undesirable consequence, a differentiating network, and a current path provided by the forward search control only when in the "off" condition, are incorporated in the command path between the travel limit switch and the control electrode of the thyristor. While these interpositions do not interfere with transmission of a turn-on command to the thyristor when the housing is carried to the travel limit position during play mode operations, they preclude thyristor turn-on when the housing is carried to the travel limit position during forward search mode operations. In the latter circumstance, the housing remains at the travel limit position, until released therefrom by actuation of an appropriate control (e.g., reverse search).

Pursuant to a further aspect of the present invention, which aids in simplification of the control system circuitry, the reverse solenoid is used as a low impedence current path for conveying control currents to the input circuits of respective control devices which serve to effect energization of forward and play solenoids. With suitable current limiting impedances in these control current paths, performance of this function is carried out with current through the reverse solenoid of a magnitude less than the threshold current level required for actuation of the reverse solenoid mechanism.

In accordance with an additional aspect of the present invention, a diode is interconnected between an output electrode of a control device for the forward solenoid and an input electrode of a control device for the play solenoid, with the diode poled in a manner ensuring the bypassing of any turn-on control currents for the play control device whenever the forward control device is conducting. This arrangement positively precludes energization of the play solenoid whenever the forward solenoid is energized.

In accordance with a further aspect of the present invention, those current paths in which the flow of current causes energization of the reverse solenoid are disposed relative to the control circuits for the forward and play control devices so that the flow of reverse solenoid energizing current in these paths holds such control devices in a cutoff condition. This arrangement positively precludes energization of either the play or forward solenoids whenever the reverse solenoid is energized.

Pursuant to another aspect of the present invention, the control system includes charge storage means for maintaining a forward bias across the anode-cathode path of the previously mentioned thyristor for a short period after a latched energization of the reverse solenoid terminates in a toggling of the rest switch to its "off" position. This forward bias maintenance avoids a problem that could otherwise accompany a bounce of the rest switch elements upon toggling. That is, as the rest switch goes off, breaking the circuit that supplies forward bias to the anode-cathode path of the thyristor, a rapid turn-off of the thyristor ensures (in the absence of the aforesaid charge storage means). If bouncing of the rest switch elements momentarily remakes the circuit, the hold off of the forward solenoid provided by the thyristor conduction will be absent, and initiation of a new, undesired playback cycle may ensue. However, with the forward bias maintenance provided by charge storage means, the continued thyristor conduction results in a continued hold off of the forward solenoid during make-and-break bouncing of the rest switch elements.

In accordance with an additional feature of the present invention, circuitry interconnected with both the play solenoid and the travel limit switch is employed to develop a signal providing a consistent indication of all absences from a play mode of operation for the players. Illustratively, use is made of the developed signal during such absences to cause squelching of the video and audio signal outputs of the player, as well as to cause effective disabling of the player's armstretcher (provided for time base error correction purposes, as described, for example, in U.S. Pat. No. 3,711,641—Palmer).

Figure 1:
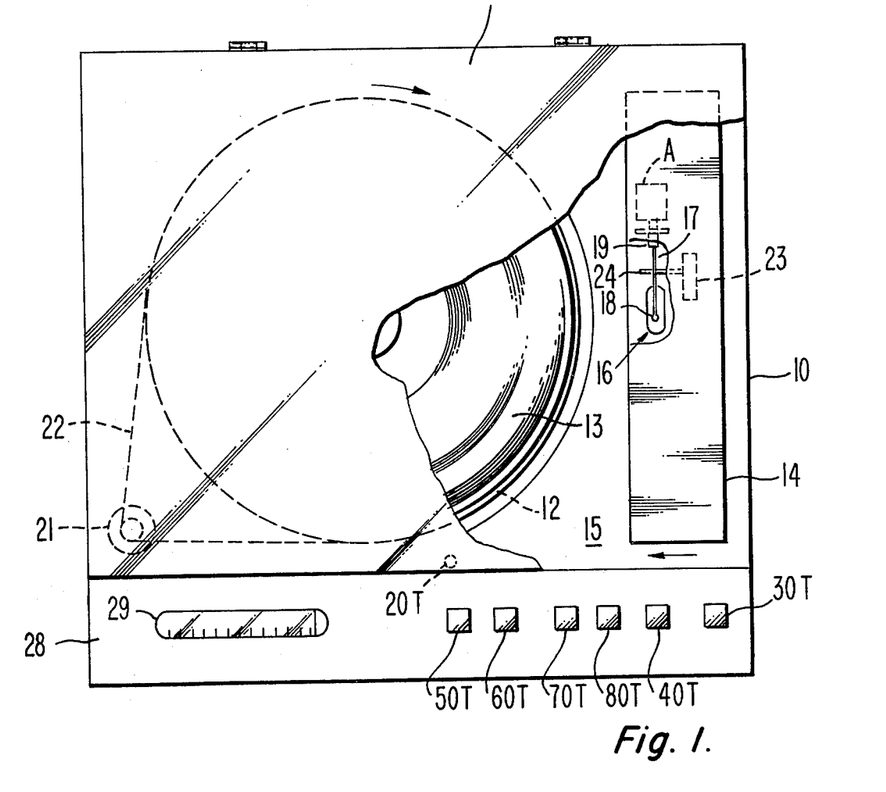
FIG. 1 provides a plan view of a video disc player employing a control system in accordance with the principles of the present invention, with the player lid partially broken away to reveal the turntable and pickup arm housing of the player.

In the video disc player plan view of FIG. 1, a cabinet 10 having a hinged lid 11 is shown with the lid 11 closed, but partly broken away to reveal interior components. A turntable 12 is mounted for rotation in a well formed in a motorboard 15, which supports a motor 21; a belt 22 is employed to transmit rotational drive to the turntable 12 from the motor 21. A video disc record 13 of the previously mentioned Clemens type is supported by the turntable 12. A translatable pickup arm housing 14 is shown in its rest position at one side of the turntable 12.

The cover of the housing 14 is partially broken away to show a pickup arm 17, pivotally supported at one end by a flexible coupler 19. At its opposite end, the pickup arm 17 supports a stylus 18. Illustratively, the stylus 18 is of the general type shown in the aforementioned Clemens patent, and includes a stylus electrode forming a variable capacitor with the record's conducting coating as variations in the record's groove bottom geometry (representative of recorded color picture and sound information) pass beneath the stylus 18 during playback operations. Also mounted within housing 14 are pickup circuits (not shown), which are suitably connected to the stylus electrode and convert the capacitance variations to an electrical signal form representative of the recorded information. Desirably, the pickup circuits are of the type shown in the copending U.S. patent application, Ser. No. 743,144, of H. Kawamoto, et al.

Also supported in the housing 14 is a stylus lifting-/lowering mechanism 23, including a rod 24 for engaging the pickup arm 17. Illustratively, the lifting/lowering mechanism 23 is of an electromagnetically controlled type, as shown, for example, in the copending U.S. patent application, Ser. No. 667,309, of M. Leedom, et al, now U.S. Pat. No. 4,053,161. When the mechanism 23 is energized (during housing location over record 12), the rod 24 is lowered, permitting arm 17 to pivot downwardly to allow stylus 18 to protrude through an aperture 16 in the housing bottom (to a degree sufficient to effect engagement with the bottom of the spiral groove of record 13). When the mechanism 23 is de-energized, the rod 24 is elevated, pivoting arm 17 upwardly to raise stylus 18 within the housing 14.

Additionally mounted within housing 14 is an arm-stretcher A, of the general type described in U.S. Pat. No. 3,711,641 — Palmer which supplies longitudinal motion to the pickup arm 17 to oppose spurious cyclical variations of the relative motion between stylus and groove. Illustratively, the circuitry for controlling the armstretcher A is as shown in U.S. Pat. No. 3,965,482 — Burrus, while the coupling between the armstretcher A and pickup arm 17 is desirably effected in the manner described in the copending U.S. patent application, Ser. No. 667,388, of M. Leedom, now U.S. Pat. No. 4,040,635.

An actuator 20T for a safety switch, responsive to the closing of lid 11, is diagrammatically indicated in FIG. 1. The player of FIG. 1 also includes a slanted control panel 28 at the front of the cabinet 10. Six manual actuators (30T, 40T, 50T, 60T, 70T and 80T) for function controlling switches of the player are mounted in the control panel 28, which also presents a dial indicator for representing to the user the location of the housing-supported stylus 18 relative to the successive convolutions of the groove of the turntablesupported record 13.

Actuator 30T controls a latching switch serving a power on/off function, while actuator 40T controls a momentary switch serving a play-initiating function. Actuator 50T controls a momentary switch providing a forward search facility, while actuator 60T controls a momentary switch providing a reverse search facility. A momentary switch providing a reject function is controlled by actuator 70T, and a latching switch serving a pause function is controlled by actuator 80T. When the player has been switched into a pause mode by actuator 80T, a subsequent unlatching of the pause switch can be effected by actuation of any one of the actuators 40T, 50T, 60T and 70T (due to provision of a mechanical intercoupling, not shown, for effecting such unlatching). The respective switches (20, 30, 40, 50, 60, 70 and 80) controlled by the actuators 20T, 30T, 40T, 50T, 60T, 70T and 80T of FIG. 1 are shown schematically in the control system schematic of FIG. 2, now to be described. All of the switches in FIG. 2 are illustrated in their "off" condition (i.e., in the switching positions assumed when the housing 14 is in its rest position, the lid 11 is open, and power to the player is off.

Figure 2:
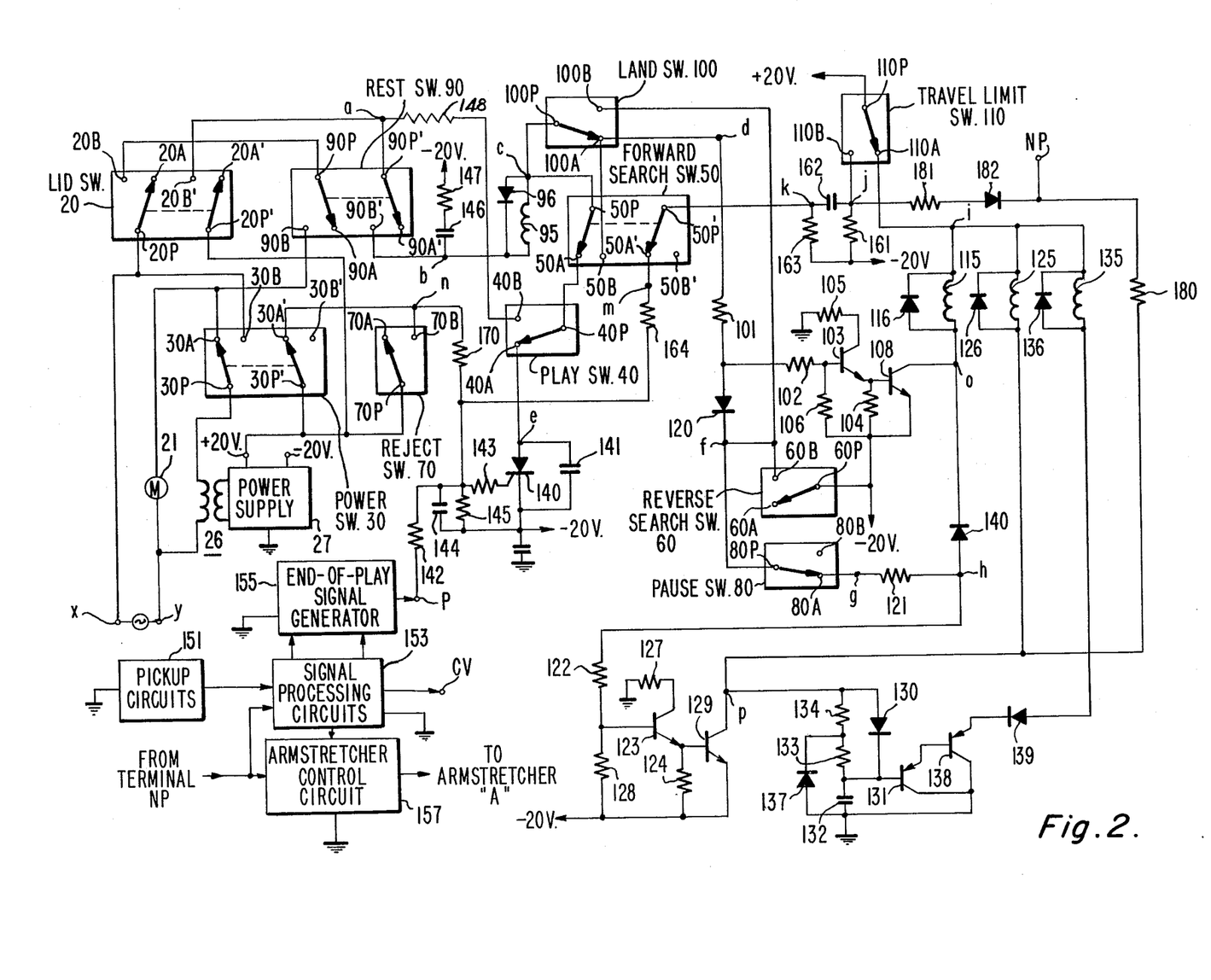
FIG. 2 illustrates, partially schematically and partially by block diagram representation, control system circuitry for use in the player of FIG. 1, in accordance with an embodiment of the present invention.

In FIG. 2, the control system includes a pair of alternating current input terminals $x$, $y$, subject to connection to a suitable source of alternating current (as, for example, by conventional power cord connection to the usual house current, or mains, supply). Terminal "$x$" is directly connected to the pole terminal 20P of an AC section of a double-pole, double-throw lid switch 20, and to "on" terminal 30B of an AC section of a double-pole, double-throw power switch 30. Pole terminal 30P of the power switch AC section is connected via the primary winding of a power transformer 26 to terminal "$y$", while the "off" terminal 30A of the power switch AC section is connected via the energizing winding of the turntable motor 21 to terminal "$y$". The secondary winding of power transformer 26 is coupled to the input of a power supply 27, which develops DC output voltages of +20 volts and −20 volts, at respective output terminals so labeled, when energized. A double-pole, double-throw rest switch 90 (of a latching type) has an AC switching section including (1) a pole terminal 90P, directly connected to "on" terminal 20B of the lid switch AC section; (2) an "off" terminal 90A not externally connected, and (3) an "on" terminal 90B directly connected to terminal 30A. The "off" terminal 20A of the lid switch AC section is not externally connected.

When switches 20, 30 and 90 are all off, as shown, no energizing current is supplied to either motor 21 or power supply 27, and the player is inactive. With the lid (11) closed, and the power switch 30 turned on (but with the rest switch 90 in off condition), the primary winding of transformer 26 is energized with alternating current supplied via the current path provided between terminals 30P, 30B of power switch 30, but the motor 21 remains unenergized. When switches 20, 30 and 90 are all on, the motor 21 is also energized, via a circuit completed by the 20P-20B and the 90P—90B paths. If the power switch 30 is switched off, while the lid and rest switches (20, 90) remain on, the aforesaid motor energization circuit is maintained, while the power transformer primary winding receives energization via the 90P-90B and 30P-30A paths.

The +20V. output terminal of power supply 27 is directly connected to the pole terminal 20P' of the DC section of lid switch 20, and via the 20P'-20B' path of this DC section, during a lid switch on condition, to terminal "a", and the pole terminal 90P' of the rest switch DC section. This DC section provides a path (90P'-90B') linking terminal "a" to terminal "b" when the rest switch 90 is on. The energizing winding 95 of the reverse solenoid mechanism of the player provides a low impedance DC path between terminal "b" and terminal "c".

A single-pole, double-throw play switch 40 has (1) a pole terminal 40P connected to an off terminal 50A of a double-pole, double-throw forward search switch 50; (2) an on terminal 40B connected to terminal "a" via resistor 148; and (3) an off terminal 40A connected to terminal "e". In its off condition, switch 50 provides a connection between terminal 50A and pole terminal 50P which links terminal "c" to play switch pole terminal 40P. In its on condition, switch 50 provides a connection between terminal 50P and "on" terminal 50B that links terminal "c" to the off terminal of a single-pole, double-throw land switch 100, and to terminal "d". In its off condition, the 100P-100A path provided by land switch 100 directly links terminals "c" and "d". In its on condition, the 100P-100B path provided by land switch links terminal "c" to the "on" terminal 60B of a single-pole, double-throw reverse search switch 60, and to terminal "f". The pole terminal 60P of switch 60 is connected to the −20V. terminal, while the off terminal 60A is not externally connected.

A resistor 101, in series with a diode 120, is connected between terminals "d" and "f". The junction of resistor 101 and the anode of diode 120 is connected via a resistor 102 to the base of an NPN transistor 103. Transistor 103 has its collector connected to point of ground potential via a resistor 105, its emitter connected to the −20V. terminal via a resistor 104, and its base connected to the −20V. terminal via a resistor 106. A forward solenoid driver function is served by an NPN transistor 108 having its base connected to the emitter of transistor 103, its emitter connected to the −20V. terminal, and its collector connected via the energizing winding 115 of the forward solenoid mechanism of the player to terminal "i". A diode 116 shunts winding 115, with its cathode connected to terminal "i".

Terminal "f" is connected to the pole terminal 80P of a single-pole, double-throw pause switch 80. In its "off" condition, the 80P-80A path provided by pause switch 80 links terminal "f" to terminal "g". The on terminal of switch 80 is not externally connected. A resistor 121 is connected between terminals "g" and "h", with the latter terminal connected to the anode of a diode 140, the cathode of which is linked to terminal "o" (at the collector of transistor 108).

A resistor 122 is connected between terminal "h" and the base of an NPN transistor 123. Transistor 123 has its collector connected to ground via resistor 127, its emitter connected to the −20V. terminal, via resistor 124, and its base connected to the −20V. terminal via resistor 128. A play solenoid driver function is served by an NPN transistor 129 having its base connected to the emitter of transistor 123, its emitter connected to the −20V. terminal, and its collector (terminal "p") connected via the energizing winding of the play solenoid mechanism of the player to terminal "i". A diode 126 shunts winding 125, with its cathode connected to terminal "i".

Terminal "p" is connected by the series combination of resistor 134, resistor 133 and capacitor 132 to a point of ground potential. A diode 130 is shunted across the series combination of resistors 133 and 134, with the diode anode connected to terminal "p". A diode 137 is shunted across the series combination of resistor 133 and capacitor 132, with the diode anode grounded.

The base of a PNP transistor 131 is connected to the cathode of diode 130, and the collector of transistor is grounded. The function of driver for the energizing winding 135 of the pickup arm lowering mechanism (23, FIG. 1) of the player is served by NPN transistor, with its base connected to the emitter of transistor 131, its collector grounded, and its emitter connected via diode 139 and winding 135 to terminal "i". Diode 136 shunts winding 135, with the cathode of diode 136 connected to terminal "i", and the anode of diode 136 connected to the anode of diode 139.

Terminal "i" is connected to the "off" terminal 110A of a single-pole double-throw travel limit switch 110. The current path between terminal 110A and the pole terminal 110P, provided when switch 110 is off, links terminal "i" to the +20V. terminal. When switch 110 is on, the current path between terminal 110P and "on" terminal 110B links the +20V. terminal to terminal "j". Terminal "j" is connected via resistor 161 to the −20V. terminal, and via the series combination of resistor 181 and diode 182 to the terminal NP. Resistor 180 is connected between terminal "p" and the cathode of diode 182 (at terminal NP).

The anode-cathode path of a thyristor 140, illustratively in the form of a silicon controlled rectifier (SCR), is connected between terminal "e" and the −20V. terminal, with the SCR anode connected to terminal "e". Resistors 143 and 145 are connected in series between the thyristor control electrode (SCR gate) and the thyristor cathode, with a capacitor 144 shunted across the resistor 145.

The DC section of power switch 30 provides a current path between pole terminal 30P' and "off" terminal 30A', when switch 30 is off, that links the +20V. terminal to terminal "n". The "on" terminal 30B' of the power switch DC section is not externally connected. A single-pole, double-throw reject switch 70 provides a current path between pole terminal 70P and "on" terminal 70B, when switch 70 is switched on, that also links the +20V. terminal to terminal "n". The "off" terminal 70A of switch 70 is not externally connected. Terminal "n" is connected by resistor 170 to the junction resistors 143 and 145 in the thyristor's control electrode circuit.

Terminal "j" is coupled via a capacitor 162 to terminal "k" (at the pole terminal 50P' of forward search switch 50). When switch 50 is off, the path provided between pole terminal 50P' and "off" terminal 50A' links terminal "k" to terminal "m" terminal 50B' of switch 50 is not externally connected. Terminal "m" is connected by resistor 164 to the junctions of resistor 143 and 145 in the thyristor's control electrode circuit.

The player's pickup circuits 151, which convert capacitance variations sensed by stylus 18 to electrical signals representative of recorded information, deliver an output to signal processing circuits 153, illustratively of the general type disclosed in the copending U.S. Patent application, Ser. No. 590,484 now U.S. Pat. No. 4,017,677, of A. Baker. The signal processing circuits 153 normally develop during playback a composite video signal output at terminal CV in a form suitable for use in a standard broadcast color television receiver. Desirably, however, the processing circuits 153 include squelch circuitry for suppressing the output at terminal CV during times when the player is not operating in a play mode. A single indicating when the player is not in a play mode is supplied to processing circuits 153, for such squelch purposes, from terminal NP.

Signal processing circuits 153 also develop signals indicative of spurious variations of relative motion between stylus and record groove, and supply these signals to an armstretcher control circuit 157 to control the operation of armstretcher A (FIG. 1). The not-play indicating signal from terminal NP is also supplied to armstretcher control circuit 157 to effectively disable armstretcher A during non-playing intervals. This disabling action may be effected, for example, in the manner disclosed in the aforementioned Burrus patent.

An end-of-play signal generator 155 is also responsive to outputs of processing circuits 153, and serves to develop an end-of-play control signal at terminal P when such outputs are indicative of recovery of recorded end-of-play information (the control signal development being effected, for example, in the manner described in the copending U.S. patent application, Ser. No. 590,483, now U.S. Pat. No. 4,017,678, of A. Baker). Terminal P is connected by resistor 142 to the junction of resistors 143 and 145 in the control electrode circuit of thyristor 140. The control system of FIG. 2 additionally includes the series combination of capacitor 146 and resistor 147, connected between terminal "b" and the −20V. terminal.

Before explaining the operation of the control system of FIG. 2, it is appropriate to explain the nature of the system for supplying translatory motion to housing 14, and the interaction between such a translating system and certain of the switches of the FIG. 2 control system.

Figure 3:
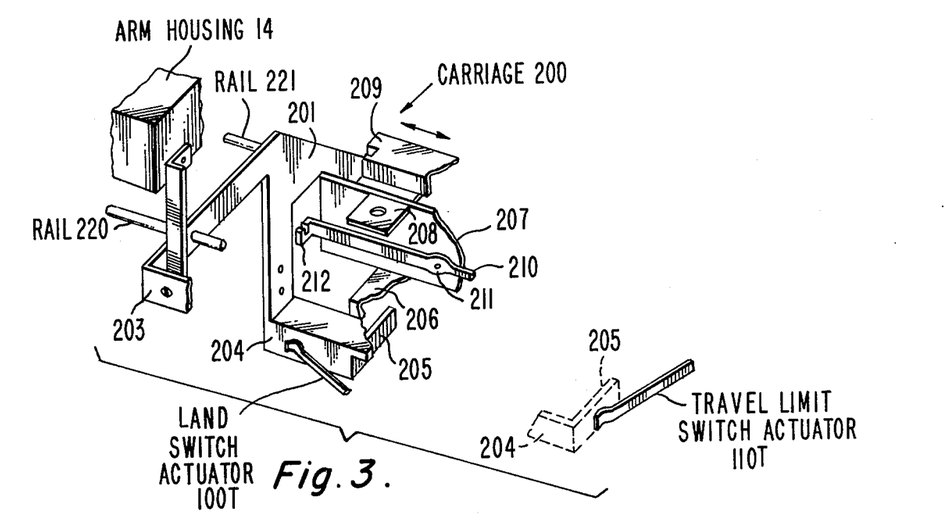
FIG. 3 provides a perspective view of a translatable arm housing carriage and associated switch actuating members for use in the player of FIG. 1 in an illustrative implementation of the control system of FIG. 2.

In FIG. 3, a perspective view, partially broken away, is provided of the translating carriage 200, to which housing 14 is secured and which provides support for the various belt gripping solenoid mechanisms which provide selective control of direction and speed of housing motion. Carriage 200 is mounted for sliding translation on a pair of cylindrical rails 220, 221, which pass through apertures in the illustrated carriage side wall 201, and the opposed (not illustrated in FIG. 3) carriage side wall 202. The sidewalls 201, 202 are interconnected by a vertically extending central wall 207, a vertically extending edge wall 203, and a plurality of horizontally extending shelves, including an edge shelf 209. The carriage 200 also includes a pair of downwardly depending flanges 204 and 205, the flange 204 extending parallel to the direction of travel of the carriage 200, and the flange 205 extending perpendicular to the direction of travel of carriage 200.

In the showing of FIG. 3, motion from left to right serves to move carriage 200, and the housing 14 secured thereto, away from the rest position (FIG. 1). During an initial portion of travel of the housing 14 away from the rest position, flange 204 is in contact with land switch actuator 100T, holding land switch 100 in an "off" condition. When carriage 200 moves sufficiently to the right of the position pictured in FIG. 3, actuator 100T clears flange 204, and land switch 100 switches to an "on" condition. Actuator 100T is so located that this switching occurs when stylus 18 is over the outermost information-containing convolutions of the groove of disc record 3. In the absence of disruption of its forward motion, carriage 200 will continue to move to the right of its pictured position in FIG. 3, until flange 205 occupies its travel limit position (shown in phantom), in which position flange 205 engages the travel limit switch actuator 110T, causing the travel limit switch 110 to switch from "off" to "on".

A lever 210 is mounted for rotation about a pivot 211 on the side of central wall 207 facing edge wall 203. One end of lever 210 projects through an opening in side wall 201 and terminates in a projection 212, angled toward wall 203, and having a notch in its upper surface. A wire spring (not snown in FIG. 3) is secured to wall 201 and is provided with a projection that engages the notch in projection 212 to urge projection 212 downward. A horizontal shelf 206, extends from the bottom of central wall 207 and limits downward motion of lever 210, which severs a rest switch controlling function, to be explained subsequently. An apertured ledge 208 extends in the direction of wall 203 from the top of central wall 207.

Figure 4:
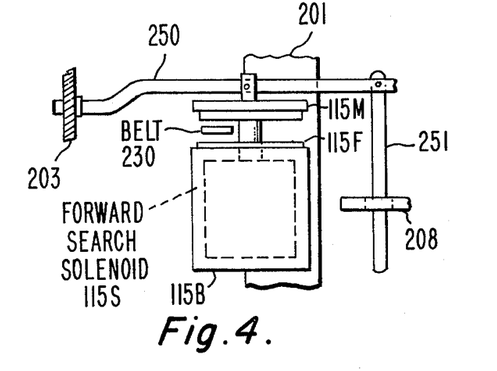
FIGS. 4, 5 and 6 provide side views of respective solenoid mechanisms subject to mounting on the carriage of FIG. 3 in the illustrative implementation of the control system of FIG. 2.

FIG. 4 provides a side view of the forward solenoid mechanism of the player. A forward search solenoid 115S (having an energizing winding 115, FIG. 2) is supported by a bracket 115B secured to the carriage side wall 201. The solenoid mechanism includes a movable member 115M, which is moved toward fixed member 115F when winding 115 is energized, to firmly grip a segment of belt 230 passing therebetween (in the manner described in the aforementioned Torrington patent). The orientation of the circulating loop formed by belt 230 relative to the gripping members is such that belt 230 carries 200, and housing 14 secured thereto away from the rest position (and at a speed that is fast relative to the speed necessary to follow a groove tracking stylus).

When movable member 115M moves downward upon energization of winding 115, it pulls downward an intermediate point of lever 250 to which it is pivotally coupled. Lever 250 pivots downward about a fulcrum at one end mounting, which is supported by carriage edge wall 203 (FIG. 3). A pin 251, pivotally coupled to end of lever 250 remote from wall 203, is thus moved downward upon winding energization, with the aperture in ledge 208 (FIG. 3) serving a guiding function for the pin motion. The motion of pin 251 is utilized for switching the rest switch 90 from "off" to "on", as will be explained more fully, subsequently.

Figure 5:
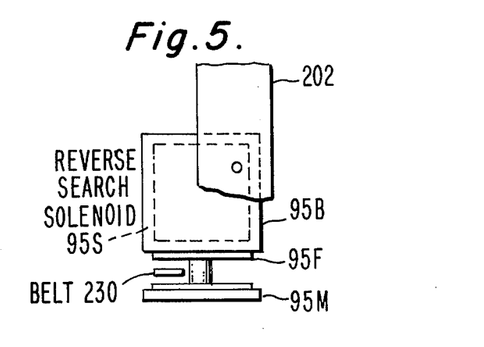

FIG. 5 provides a side view of the reverse solenoid mechanism of the player. A reverse search solenoid 95S (having an energizing winding 95, FIG. 2). is supported by a bracket 95B secured to carriage side wall 202. Movable member 95M moves toward fixed member 95F when winding 95 is energized (with current above a threshold value) to effect firm gripping of a segment of belt 230 which is moving toward the rest position.

Figures 6, 8:
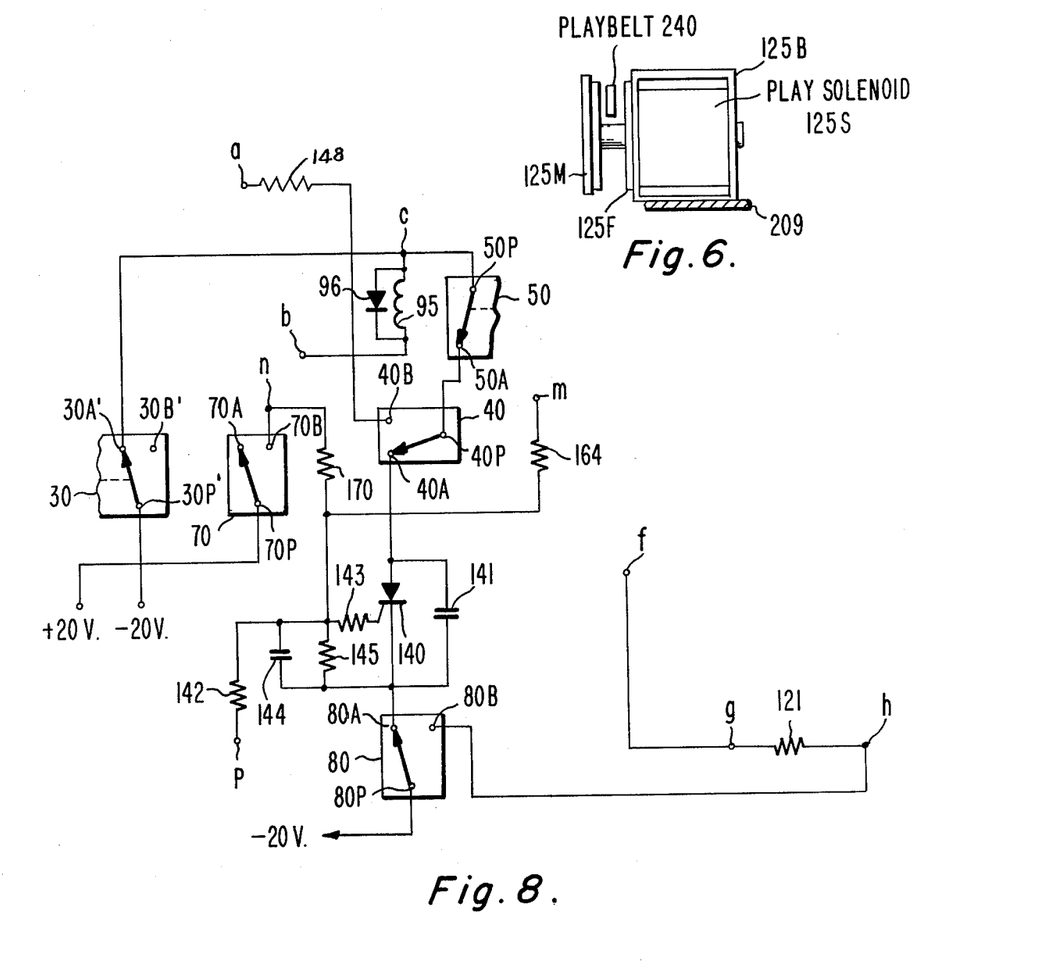
FIG. 8 illustrates schematically a modification of a portion of the control system of FIG. 2, in accordance with a further embodiment of the present invention.

FIG. 6 provides a side view of the play solenoid mechanism of the player. A play solenoid 125S (having an energizing winding 125, FIG. 2) is supported by a bracket 125B secured to the carriage shelf 209 (FIG. 3). When winding 125 is energized, movable member 125M moves toward fixed member 125F to firmly grip a segment of the play belt 240 which is moving away from the rest position (and at a speed appropriate to matching the translation of a groove tracking stylus.

Figure 7A:
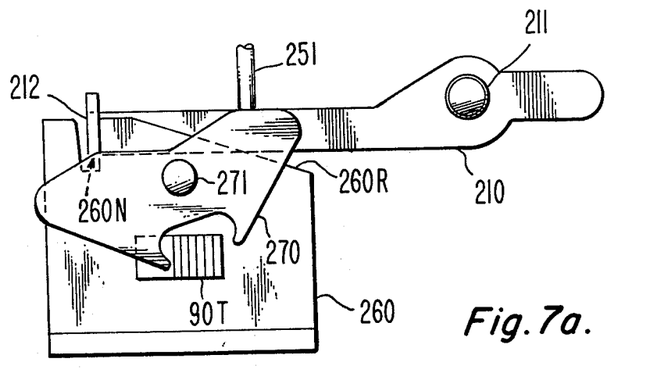
FIGS. 7A AND 7B provide side view illustrations, under respectively different switching conditions, for a switching device and associated actuating members, subject to use in implementation of the control system of FIG. 2.
Figure 7B:
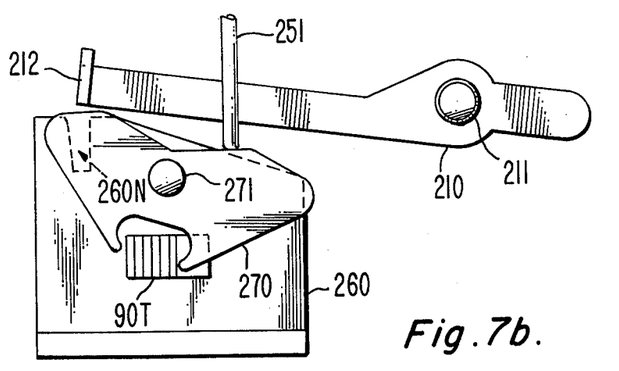

FIGS. 7a and 7b comprise a pair of side views of control means for the rest switch 90 of FIG. 2, with FIG. 7a illustrating conditions at the completion of the switching of rest switch 90 to an "off" condition by the action of the spring-biased lever projection 212 (FIG. 3), and FIG. 7b illustrating conditions at the completion of the switching of rest switch 90 to an "on" condition by the action of the solenoid-pulled pin 251 (FIG. 4).

In the final segment of carriage travel to a rest position, the projection 212 of carriage mounted lever 210 engages an upwardly inclined ramp portion 260R of the upper surface of a bracket 260. As reverse travel continues, the projection 212 is forced upward against the opposing force of a spring not shown exerted by its projecting end which is lodged in the notch of lever projection 212. As projection 212 rides onto a flat at the end of the ramp portion 260R, it comes into registry with a notch 260N in the bracket's upper surface, whereupon the spring forces projection 212 downward into the notch. The downward motion of projection 212 produces a counterclockwise rotation of toggle 270 about pivot 271 to shift the rest switch actuator 90T to the right (as viewed in FIGS. 7a and 7b) to cause rest switch turn-off. In the resultant condition shown in FIG. 7a, rest switch 90 is off, and the carriage 200 (to which lever 210 is secured) is mechanically latched against translatory motion.

The pin 251 is in its up position depicted in FIG. 7a throughout the above described up and down motions of the returning carriage lever 210, since the forward solenoid 115 is in a de-energized state during reverse travel of the carriage 200.

When the forward solenoid 115 is energized at some time subsequent to occupancy of notch 260N by projection 212, the result is a downward motion of pin 251 to force a clockwise rotation of toggle 270 about pivot 271, and a shift of actuator 90T to the left (as viewed in FIGS. 7a and 7b). This action effects a turn-on of rest switch 90, as well as an ejection of the projection 212 from slot 260N. Since the ejection coincides with the forward solenoid energization, the pull of belt 230 rapidly removes projection 212 from the notch vicinity, to allow unimpeded forward travel of the carriage 200.

In explanation of the operation of the control system of FIG. 2, a presentation of the normal playback cycle will first be presented.

To begin operations, after a record 13 is placed on the turntable 12, the power switch 30 is turned on, supplying AC to the transformer 26, and enabling power supply 27 to develop DC potentials for operation of the solenoids. With the lid 11 closed to place lid switch 20 in an on condition, a positive operating potential appears at terminals "a" and "i". Actuation of the play switch 40 completes a current path between terminals "a" and "d" via the on play switch 40, the off forward search switch 50, and the off land switch 100. Appearance of the positive potential at terminal "d" forward biases transistors 103 and 108. The conducting transistor 108 returns one end (terminal "o") of forward solenoid winding 115 to the −20V. terminal, while the off travel limit switch 110 links the +20V. terminal to the other winding end (terminal i). The resultant energization of the forward solenoid effects engagement of the fast forward belt segment (FIG. 3), switching of the rest switch 90 to the "on" condition, and disabling of the mechanical latching of the carriage 200, and turn-on of turntable motor 21.

The carriage 200 moves forward rapidly until it reaches the land position, when land switch 100 is switched on. The land switch path to terminal "d" is now open, but a land switch path to terminal "f" is now provided, whereby forward bias for transistors 123 and 129 is now available (via off pause switch 80), while forward bias for transistors 103, 108 is now absent. Turnoff of transistor 108 frees terminal "h" of clamping action (provided by diode 140 and collector-emitter path of transistor 108) that precluded turn-on of play solenoid driver during energization of forward solenoid winding 115.

The play belt 240 is now gripped by the energized play solenoid mechanism, and the carriage forward speed slows, so as to substantially match the translatory motion imparted to the stylus 18 by the record groove as the stylus is lowered thereto by mechanism 23. The lowering is controlled by a ramp wave developed as the charge on capacitor 132 is altered to turn on, and controllably increase conduction in, transistors 131, 138, in response to the drop in potential at terminal "p".

Playback of the record now proceeds until recovery of end-of-play indicating information by pickup circuits 151 causes end-of-play signal generator 155 to develop an output at terminal P which forward biases the gate-to-cathode path of SCR 140. With the cathode at −20V., and the anode connected to +20V. (via the off play switch 40, the off forward search switch 50, winding 95, the on rest switch 90, and the on lid switch 20), thyristor turn-on is accomplished. Terminal "c" becomes negative, precluding forward bias for play and forward driver, while an adequately large energizing current for reverse solenoid winding 95 flows therethrough. The reverse travel segment of the loop formed by belt 230 is now gripped, and the carriage moves toward rest position rapidly. The loss of the initiating end-of-play signal does not interrupt the travel as the thyristor 140 now provides latched energization of winding 95, independent of control circuit conditions. Passage of the land position has no effect, despite switching of the land switch 100 to off, since the energization path for the thyristor is not via the land switch. When rest position is reached, the rest switch 90 is switched off, disabling the reverse solenoid and turning off motor 21.

If end-of-play signal generation does not take place at the end of a playback cycle, the further forward travel of carriage 200 turns the travel limit switch on, removing +20 volts from terminal "i" to disable the play solenoid. Additionally, a rise in potential at terminal "j" occurs which is differentiated by capacitor 162 and resistor 163 to supply forward bias momentarily to the thyristor control circuit. This is sufficient to initiate the latched return travel described above. The latched return travel may also be initiated as an interruption of play, by momentary actuation of the reject switch to supply forward bias to the control circuit of the thyristor via terminal "n".

If the power switch 30 is switched off during absence of the housing 14 from its rest position, a latched return travel will also be initiated with forward control bias supplied via terminal "n". It will be noted that in this circumstance, AC continues to be supplied to transformer 26 and motor 21 (despite the power "off" condition) to permit the desired return travel. When rest switch 90 is switched off in this circumstance, a complete power off situation ensues.

One may interrupt play to initiate a fast forward travel by actuating the forward search switch 50 to "on" to pass a forward bias to terminal "d" and turn on the forward solenoid, shutting down the play driver. If travel limit is exceeded during forward search a latched return travel is not automatically initiated. The path from "k" to "m" is disrupted during forward search, so that the differentiated impulse is not delivered to the SCR gate. When forward search is later released, the housing waits at the travel limit position for an appropriate command (e.g., reject, reverse search).

One may interrupt play to initiate an unlatched energization of the reverse solenoid by turning the reverse search switch 60 on. This completes an energization path for winding 95 that is independent of thyristor 140. If reverse search should carry the carriage 200 beyond the land position to shift the land switch 100 off, the unlatched energization path for winding 95 is opened, and reverse travel ends short of the rest position. When reverse search is subsequently released, a short forward energization reverses the switching of the land switch, and play then resumes.

The "not play" information available at terminal "p", in all but one condition other than play, is a positive potential due to the cutoff of driver 129. However, when one is in the travel limit position, a positive potential is removed from terminal "i", and "not play" is not consistently indicated by the potential at "p". To solve this problem, limit switch terminal 110B is returned to terminal NP via resistor 181 and diode 182, in addition to the coupling thereto to terminal "p" via resistor 180. With suitable resistor proportioning, a consistent "not play" indication may be developed (for video and arm-stretcher squelching) for all non-playing modes.

As previously noted, unlatching of latched return travel may be effected by turning on play switch 40 or forward search switch (to open the main thyristor conduction path). Also as previously noted, the series combination of capacitor 146 and resistor 147, coupled between terminal "b" and the −20V. terminal, provide protection against adverse rest switch bounce conditions by briefly holding bias for the anode-cathode path of the thyristor after switching of rest switch to off.

FIG. 8 illustrates a modification of the FIG. 2 system, with new dispositions for the pause switch 80, and the DC section of the power switch 30. The changes allow the pause switch 80 to interrupt the thyristor anode-cathode path, whereby pause switch actuation becomes another facility for latched return travel unlatching. Pole terminal 80P is connected to the −20V. terminal, while off terminal 80A connects to the thyristor cathode. When the modified pause switch 80 is "on", the thyristor's main current path is disrupted, while cutoff bias is supplied to the play driver via terminal "h".

In the modified power switch coupling of FIG. 8, the pole terminal 30P' returns to the −20V. terminal, while "off" terminal 30A' is connected to terminal "c". With this arrangement, a path for latched reverse solenoid energization is provided which is independent of thyristor 140, and which is not subject to unlatching by play, forward search or pause controls. This path is set up whenever the power switch is turned off during absences of the housing 14 from its rest position, and ensures its prompt return thereto and prompt total power shutdown.

What is claimed is:

1. In a disc record player, including a rotatable turntable for supporting a disc record; a motor for supplying rotational drive for said turntable when supplied with an energizing alternating current; a stylus arm for supporting at one end thereof a pickup stylus; a housing for said stylus arm; a carriage secured to said housing and subject to a translational movement providing motion of said housing between a rest position remote from said turntable and playback positions over said turntable; and a power supply for developing an operating potential between a pair of output terminals when energized with alternating current; a player control system including, in combination:

a power switch completing a first current path, for supplying an energizing alternating current to said power supply, only when switched to an "on" position;

a play initiating switch subject to manual actuation; and a rest switch, subject to switching from a first switch position to a second switch position, when actuation of said play initiating switch coincides with housing occupancy of said rest position;

said rest switch, when in said second switch position, (a) completing a second current path for supplying energizing alternating current to said motor, and (b), in cooperation with said power switch, completing a third current path for supplying energizing alternating current to said power supply when said power switch is in an "off" position;

said rest switch responding to a return of said housing to said rest position from positions removed therefrom by switching from said second switch position to said first switch position in which said second and third current paths are disrupted.

2. A control system in accordance with claim 1 also including a movable member subject to translational movement in a direction away from said rest position during energization of said motor; and wherein said switching of said rest switch from said first switch position to said second switch position is effected by apparatus including:

solenoid means, mounted on said carriage, for effecting a coupling between said carriage and said movable member when energized;

means for initiating energization of said solenoid means when actuation of said play initiating switch occurs during housing occupancy of said rest position; and means, mechanically coupled to said solenoid means, for switching said rest switch to said second switch position when energization of said solenoid means is initiated during housing occupancy of said rest position.

3. In a disc record player including a rotatable turntable for supporting a disc record; a stylus arm for supporting at one end thereof a pickup stylus; a housing for said stylus arm; a carriage secured to said housing, and subject to a translational movement providing motion of said housing between a rest position remote from said turntable and playback positions over said turntable; and a power supply for developing an operating potential between a pair of supply terminals when energized with alternating current; a player control system including, in combination:

a thyristor having an anode, a cathode and a control electrode;

a control winding;

means, responsive to energization of said control winding during rotation of said turntable, for causing motion of said housing in a direction toward said rest position;

first switching means for normally providing a coupling of the series combination of said control winding and the anode-cathode path of said thyristor across said pair of supply terminals during absences of said housing from said rest position;

additional switching means, subject to manual actuation, for supplying a forward bias exceeding a turn-on threshold level between said control electrode and said cathode during said actuation; and further switching means, subject to manual actuation, for effecting, during said actuation, a connection of said control winding between said pair of supply terminals which is independent of said thyristor whereby a motion of said housing toward said rest position which is initiated by actuation of said further switching means can be terminated by cessation of said actuation, whereas a motion of said housing toward said rest position which is initiated by actuation of said additional switching means is not terminated by mere cessation of such actuation.

4. Apparatus in accordance with claim 3, also including means, responsive to the position of said carriage, for momentarily supplying a forward bias exceeding said turn-on threshold level between said control electrode and said cathode when carriage travel away from said rest position moves said housing beyond a limiting one of said playback positions.

5. Apparatus in accordance with claim 3, also including:
means, responsive to signals recovered by said pickup stylus, for developing an end-of-play signal in response to recovery of recorded end-of-play information; and
means, responsive to said end-of-play signal, for supplying a forward bias exceeding said turn-on threshold level between said control electrode and said cathode during said end-of-play signal development.

6. Apparatus in accordance with claim 3, also including;
a second control winding;
means, responsive to energization of said second control winding during rotation of said turntable, for causing motion of said housing in a direction away from said rest position at a first rate of speed;
a third control winding;
means, responsive to energization of said third control winding during rotation of said turntable, for causing motion of said housing in said direction away from said rest position at a second rate of speed, lower than said first rate of speed;
wherein said first switching means includes a pair of manually acutated switches, each of which serves to disrupt said normally provided coupling when actuation thereof occurs during a housing absence from said rest position;
one of said pair of manually actuated switches additionally serving to cause energization of said second control winding when actuation thereof occurs during a housing occupancy of a playback position;
the other of said pair of manually actuated switches additionally serving to cause energization of said third control winding when actuation thereof occurs during housing occupancy of a playback position.

7. Apparatus in accordance with claim 6 also including:
a motor for supplying rotational drive for said turntable when supplied with an energizing alternating current;
a power on/off switch having first and second power switch sections; said first power switch section completing a first current path, for supplying an energizing alternating current to said power supply, only when said power switch is in an "on" condition;
a rest switch having first and second rest switch sections; said rest switch being subject to switching from a first switch condition to a second switch condition, when actuation of said other of said pair manually actuated switches coincides with housing occupancy of said rest position; said rest switch responding to a return of said housing to said rest position from positions removed therefrom by switching from said second switch condition to said first switch condition;
said first rest switch section, when said rest switch is in said second switch condition, (a) completing a second current path for supplying energizing alternating current to said motor, and (b), in cooperation with said first power switch section, completing a third current path for supplying energizing alternating current to said power supply when said power switch is in an "off" condition.

8. Apparatus in accordance with claim 7 wherein said first switching means includes said second rest switch section, which provides a conductive path between one of said supply terminals and one terminus of said first-named control winding only when said rest switch is in second switch condition.

9. Apparatus in accordance with claim 8 wherein said second power switch section completes an additional current path between the other of supply terminals and the remaining terminus of said first-named control winding when said power switch is in said "off" condition, said additional current path being independent of said thyristor.

10. Apparatus in accordance with claim 9 wherein the flow of current in said additional path inhibits the ability of said pair of manually actuated switches to effect energization of said second and third control windings.

11. Apparatus in accordance with claim 9 also including the series combination of a resistor and a capacitor coupled between said one terminus of said first-named control winding and said other supply terminal, and wherein energization of said second and third control windings is precluded during periods of thyristor conduction.

12. In a disc record player including a rotatable turntable for supporting a disc record; a stylus arm for supporting at one end thereof a pickup stylus; a housing for said stylus arm; a carriage secured to said housing and subject to a translational movement providing motion of said housing between a rest position remote from said turntable and playback positions over said turntable; and a pair of alternating current input terminals; a player control system including, in combination:
a first latching switch alternatively providing: (1) a conductive path between a first switch terminal and a second switch terminal, when in a first switching position; and (2) a conductive path between said first switch terminal and a third switch terminal, when in a second switching position;
a power supply transformer having a primary winding and a secondary winding; said primary winding being connected between said first switch terminal and one of said alternating current input terminals;
a power supply coupled to said secondary winding for developing a unidirectional operating potential between a pair of supply output terminals upon energization of said primary winding;
means for coupling the other of said alternating current input terminals to said third switch terminal;
a motor having an energizing winding connected between said second switch terminal and said one alternating current input terminal; said motor providing rotational drive for said turntable upon energization of said winding a second latching switch alternatively (1) providing a conductive path between a fourth switch terminal and a fifth switch terminal, when in a first switching condition, and (2) isolating said fourth switch terminal from said fifth switch terminal, when in a second switching condition;

means for coupling said other alternating current input terminal to said fourth switch terminal; and means for coupling said fifth switch terminal to said second switch terminal;

whereby: (a) occupancy of said second switching position by said first latching switch when said second latching switch is in said second switching condition permits energization of said power supply transformer primary winding with alternating current supplied to said alternating current input terminals, to the exclusion of energization of said motor winding; whereas: (b) provision of said first switching condition for said second latching switch permits energization of both said transformer primary winding and said motor winding with alternating current supplied to said alternating current input terminals, with independence of the switching position of said first latching switch.

13. Apparatus in accordance with claim 12, also including:

a first solenoid mechanism including a fixed member secured to said carriage, a movable member, and a solenoid winding; wherein energization of said solenoid winding causes motion of said movable member relative to said fixed member;

means, mechanically coupled to said movable member and responsive to said motion thereof, for causing said second latching switch to switch from said second switching condition to said first switching condition when energization of said solenoid winding coincides with occupancy of said rest position by said housing;

means, secured to said carriage, for causing said second latching switch to switch from said first switching condition to said second switching condition in response to movement of said housing to said rest position;

a first momentary switch normally providing a current path between a sixth switch terminal and a seventh switch terminal, but alternatively providing a current path between said sixth switch terminal and a eighth switch terminal during actuation of said first momentary switch;

means, reponsive to the provision of said current path between said sixth and eighth switch terminals, for effecting energization of said solenoid winding when actuation of said first momentary switch coincides with (a) existence of said first switching condition for said second latching switch and (b) positioning of said first latching switch in said first switching position.

14. Apparatus in accordance with claim 13 also including:

a motion coupling member;

means, responsive to rotational motion of said turntable, for effecting movement of said motion coupling member; said motion coupling member being subject to engagement with said fixed and movable members of said first solenoid mechanism, during energization of the solenoid winding thereof, in a manner effecting motion of said housing away from said rest position.

15. Apparatus in accordance with claim 14, wherein said second latching switch additionally (1) provides a connection between a ninth switch terminal and a tenth switch terminal, when in said first switching condition, and (2) isolates said ninth switch terminal from said tenth switch terminal, when in said second switching condition; said apparatus also including:

an additional motion coupling member;

means, responsive to rotational motion of said turntable, for effecting movement of said additional motion coupling member at a reduced speed relative to the speed of said movement of said first motion coupling member;

a second solenoid mechanism having a second fixed member secured to said carriage, a second movable member and a second solenoid winding, wherein energization of said second solenoid winding causes motion of said second movable member relative to said second fixed member so as to cause engagement of said additional motion coupling member therewith in a manner effecting motion of said housing away from said rest position at said reduced speed;

a landing control switch alternatively providing (1) a conductive path between an eleventh switch terminal and a twelfth switch terminal, when in a first switching mode, and (2) a conductive path between said eleventh switch terminal and a thirteenth switch terminal, when in a second switching mode;

means, responsive to the position of said carriage, for maintaining said landing control switch in said first switching mode during housing occupancy of said rest position, and positions intermediate said rest position an an initial one of said playback positions; said landing control switch being in said second switching mode during housing occupancy of all other positions;

means, responsive to the concomitant provision of said connection between said ninth and tenth switch terminals, and said conductive path between said eleventh and twelfth switch terminals, for providing energization of said first solenoid winding during housing travel from said rest position to said initial playback position with independence of the condition of said first momentary switch;

means, normally responsive to the concomitant provision of said connection between said ninth and tenth switch terminals, and said conductive path between said eleventh and thirteenth switch terminals, for effecting energization of said second solenoid winding during housing occupancy of said playback positions; and means, responsive to energization of said second solenoid winding for effecting a lowering of said pickup arm end to a level permitting engagement of a turntable-supported record by said stylus, and responsive to deenergization of said second solenoid winding for effecting a raising of said pickup arm end to a level precluding engagement of a turntable-supported record by said stylus.

16. Apparatus in accordance with claim 15 also including:

a third solenoid mechanism having a third fixed member secured to said carriage, a third movable member, and a third solenoid winding, wherein energization of said third solenoid winding with current above a threshold current level causes motion of said third movable member relative to said third fixed member so as to cause engagement of said first-named motion coupling member therewith in a manner effecting motion of said housing in a direction toward said rest position;

a conductive connection between said ninth switch terminal and one of said supply output terminals;

means for connecting said third solenoid winding between said tenth switch terminal and said eleventh switch terminal;

a conductive connection between said eighth switch terminal and said one supply output terminal;

a second momentary switch, normally providing a conductive connection between said sixth switch terminal and said eleventh switch terminal, but disrupting said connection when manually actuated;

a thyristor having an anode, a cathode and a control electrode;

a conductive connection between said seventh switch terminal and one of said anode and cathode electrodes;

a third momentary switch, normally providing a conductive connection between the other of said anode and cathode electrodes and the other of said supply output terminals;

said operating potential being of such magnitude and polarity that application of a forward bias exceeding a turn-on threshold level between said control electrode and said cathode causes energization of said third solenoid winding with current above said threshold current level, when such application coincides with existence of said first switching condition for said second latching switch and absence of actuation of said momentary switches.

17. Apparatus in accordance with claim 16 also including a reject switch subject to manual actuation, and means responsive to actuation of said reject switch for applying a forward bias exceeding said turn-on threshold level between said control electrode and cathode.

18. Apparatus in accordance with claim 16 also including carriage actuated switching means for applying a forward bias exceeding said turn-on threshold level between said control electrode and said cathode in response arrival of said housing at a travel limit position.

19. Apparatus in accordance with claim 16 also including means coupled to said stylus for applying a forward bias exceeding said turn-on threshold level between said control electrode and said cathode during recovery of end-of-play indicating signals by said stylus.

20. Apparatus in accordance with claim 16 wherein said means for effecting energization of said second control winding includes a control device responsive to control current conveyed by a current path which includes said connection between said ninth and tenth terminals, said third solenoid winding, and said conductive path between said eleventh and thirteenth terminals, where the magnitude of said control current falls below said current threshold level.

21. In a disc record player including a rotatable turntable for supporting a disc record; a stylus arm for supporting at one end thereof a pickup stylus; a housing for said stylus arm; a carriage secured to said housing, and subject to a translational movement providing motion of said housing between a rest position remote from said turntable and playback positions over said turntable; and a power supply for developing an operating potential between a pair of supply terminals when energized with alternating current; a player control system including, in combination:

a land switch, responsive to the position of said carriage and occupying a first switching position during housing occupancy of said rest position and positions intermediate said rest position and an initial one of said playback positions, and a second switching position during housing occupancy of all other positions;

a thyristor having an anode, a cathode and a control electrode;

a control winding;

means, responsive to energization of said control winding during rotation of said turntable, for causing motion of said housing in a direction toward said rest position;

first switching means for normally providing a coupling of the series combination of said control winding and the anode-cathode path of said thyristor across said pair of supply terminals during absences of said housing from said rest position;

a record reject control, comprising a first momentary switch, subject to manual actuation, for supplying a forward bias exceeding a turn-on threshold level between said control electrode and said cathode during said actuation to normally effect, as a result of said actuation, a latched energization of said control winding for returning said housing to said rest position; and a reverse search control, comprising a second momentary switch, subject to manual actuation, for effecting, during said actuation, when said actuation coincides with occupancy of said second switching position by said land switch, a connection of said control winding between said pair of supply terminals which is independent of said thyristor; said second momentary switch being ineffective in providing such independent connection when actuation of said second momentary switch coincides with occupancy of said first switching position by said land switch;

whereby motion of said housing toward said rest position occasioned by energization of said control winding via said independent connection is limited to travel to the vicinity of said initial playback position.

22. In a disc record player including a rotatable turntable for supporting a disc record; a stylus arm for supporting at one end thereof a pickup stylus; a housing for said stylus arm; a carriage secured to said housing, and subject to a translational movement providing motion of said housing between a rest position remote from said turntable and playback positions over said turntable; and a power supply for developing an operating potential between a pair of supply terminals when energized with alternating current; a player control system including, in combination:

a travel limit switch, subject to actuation by said carriage when carriage travel away from said rest position moves said housing beyond a limit one of said playback positions;

a first control winding;

means, responsive to energization of said first control winding, for causing motion of said carriage in a direction toward said rest position;

a second control winding;

means, responsive to energization of said second control winding, for causing motion of said carriage in a direction away from said rest position;

a thyristor having an anode, a cathode and a control electrode;

a forward search control comprising a manually actuated switch normally in a first switching position, but assuming a second switching position during control activiation; said manually actuated switch, in said first switching position, providing a first current path for coupling the series combination of said first control winding and the anode-cathode path of said thyristor across said pair of supply terminals during housing absences from said rest position;

a transistor having base, emitter and collector electrodes; said transistor being normally cut off during housing occupancy of a playback position; said travel limit switch, in the absence of said actuation thereof, providing a current path for coupling the series combination of said second control winding and the emitter-collector path of said transistor across said pair of supply terminals; and means, including a capacitor coupled to said travel limit switch, for developing a momentary voltage impulse in response to actuation of said travel limit switch; said manually actuated switch, in said first switching position, providing a second current path for coupling said voltage impulse to said control electrode to effect a turn-on of said thyristor;

wherein said manually actuated switch, in said second switching position, serves to disrupt said first and second current paths, and to supply forward bias between said base and emitter electrodes to render said transistor conductive;

whereby actuation of said travel limit switch by said carriage when said manually actuated switch is in said first switching position effects a turn-on of said thyristor to provide a latched energization of said first control winding, commencing a return-to-rest motion of said housing; whereas actuation of said travel limit switch by said carriage during activation of said forward search control effects a deenergization of said second winding without effecting a turn-on of said thyristor so that said housing ceases travel at the travel limit switch actuating position and remains stationary thereat upon subsequent deactivation of said forward search control.

* * * * *